Patented Feb. 13, 1951

2,541,027

UNITED STATES PATENT OFFICE 2,541,027

COMPOSITIONS OF MATTER CONTAINING EPOXY ETHERS AND PHOSPHORUS-CONTAINING COMPOUNDS

Theodore F. Bradley, Oakland, Calif., assignor to Shell Development Company, San Francisco, Calif., a corporation of Delaware No Drawing. Application May 11, 1948, Serial No. 26,478

13 Claims. (Cl. 148—6.15)

This invention relates to compositions of matter which are useful in the manufacture of protective surface coatings, varnishes, enamels, molding compositions, adhesives, films, fibers, molded articles, etc. More particularly, the invention is concerned with compounding and reacting glycidyl ethers with phosphorus-containing compounds so as to obtain resinous products.

The compositions of the invention possess a number of outstanding advantages owing to their constitution. The compositions are particularly useful as the prime coating for protecting the surface of ferruginous metals like steel. The phosphorous compound employed in the composition not only effects resinification thereof, but it also phosphates the surface so as to rust-proof the metal. Moreover, cured compositions of the invention are well suited for surface coating materials because of excellent resistance to the action of acids, bases, and organic solvents while possessing good adhesion, hardness and toughness.

According to the present invention, an ether containing epoxy group, so as to have an epoxy equivalency greater than one, is mixed and reacted with a phosphorus-containing compound of the formula

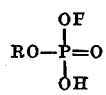

wherein R is hydrogen or an alkyl radical. The phosphorous compound may thus be orthophosphoric acid or a mono-alkyl orthophosphate. The compound is accordingly an orthophosphoric acid having at least two hydroxyl groups, and not more than one alkyl group. While this compound is used in the invention, the presence of di-alkyl and/or tri-alkyl orthophosphates in admixture therewith is not harmful and may be advantageous in some cases. The hydrocarbon substituent in the alkyl phosphates may be any alkyl group including methyl, ethyl, butyl, amyl, 2-ethylhexyl, lauryl, stearyl, etc. Preferably, however, the alkyl group contains 2 to 6 carbon atoms and is a primary, straight-chain radical. Orthophosphoric acid is a very efficient curing agent for the epoxy ethers employed in the compositions, but better flexibility for the cured material is attained by use of mono-alkyl orthophosphates since the alkyl group introduced thereby appears to plasticize the composition somewhat—i. e. the mono-alkyl orthophosphate functions as a reactive plasticizer.

The epoxy ethers contained in the compositions of the invention have at least six carbon atoms and one or more ethereal oxygen atoms. In order that the composition will cure by reaction with the phosphorous compound into material of high molecular weight and resinous character, the epoxy ether has a 1,2-epoxy equivalency which is greater than one. By the epoxy equivalency, reference is made to the average number of 1,2-epoxy groups

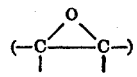

contained in the average molecule of the epoxy ether. In the case where a substantially pure, simple compound is used, the epoxy equivalency will be an integer of two or more. For example, the epoxy equivalency of diglycidyl ether or of the diglycidyl ether of ethylene glycol is two while that of the triglycidyl ether of glycerol is three. However, the epoxy ether may be a mixture of chemical compounds which, although they are of similar identity and chemical constitution, have different molecular weights. The measured molecular weight of the mixture, upon which the epoxy equivalency is dependent, will necessarily be an average molecular weight. Consequently, the epoxy equivalency of the epoxy ether mixture will not necessarily be an integer of two or more, but will be a value which is greater than one. For example, an epoxy ether particularly suitable for use in the invention is that made by reacting (bis-(4-hydrophenyl)-2,2-propane with epichlorhydrin in alkaline solution at a mol ratio of about 1.4 mols of epichlorhydrin per mol of the dihydric phenol. The product is a resinous mixture of epoxy ethers having a measured average molecular weight of 791. Analysis shows the product to contain about 0.169 equivalent of epoxy groups per 100 grams. Consequently, the product has an epoxy equivalency of about 1.34—i. e., an average of about 1.34 epoxy groups per molecule.

The epoxy ethers used in the invention preferably contain only the elements carbon, hydrogen and oxygen. They include simple monoethers such as diglycidyl ether, di(2-methylglicidyl) ether and the like as well as 1,2-epoxy-containing polyethers of polyhydric alcohols such as polyglycidyl ethers thereof like diglycidyl ether of ethylene glycol, propylene glycol, trimethylene glycol, butylene glycol, diethylene glycol, triethylene glycol, glycerol, dipropylene glycol and the like. Other typical epoxy ethers of this class include glycidyl ethers of polyhydric alcohols having a 1,2-epoxy equivalency greater than one such as the polyglycidyl ethers of glycerol, diglycerol, erythritol, pentaglycerol, pentaerythritol, mannitol, sorbitol, polyallyl alcohol, polyvinyl alcohol and the like. The polyglycidyl polyethers of the polyhydric alcohols are prepared by reacting the polyhydric alcohol with epichlorhydrin in the presence of 0.1 to about 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10%, stoichiometrical excess of a base. For this purpose, sodium aluminate gives good results.

Preparation of the polyglycidyl ethers of the polyhydric alcohols may be illustrated by considering application of the foregoing method in preparing the glycidyl ether of glycerol. In parts by weight, about 276 parts of glycerol (3 moles) are mixed with 828 parts of epichlorhydrin (9 moles). To this reaction mixture is added 10 parts of a diethyl ether solution containing about 4.5% of boron trifluoride. The temperature rises as a result of the exothermic reaction and external cooling with ice water is applied so as to keep the temperature between about 50° C. and 75° C. during a reaction period of about 3 hours. About 370 parts of the resulting glycerol-epichlorhydrin condensate are dissolved in 900 parts of dioxane containing about 300 parts of sodium aluminate. While agitating, the reaction mixture is heated and refluxed at 93° C. for about 9 hours. After cooling to atmospheric temperature, the insoluble material is filtered from the reaction mixture and low boiling substances removed by distillation to a temperature of 205° C. at 20 mm. pressure. The epoxy ether, in amount of 261 parts, is a pale yellow, viscous liquid. It has an epoxide value of 0.671 equivalent per 100 grams and the molecular weight is 324 as measured ebulloscopically in a dioxane solution. These values show that the glycidyl ether has an epoxy equivalency of 2.18—i. e., an average of 2.18 epoxide groups per molecule.

The 1,2-epoxide value of the glycidyl ether is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

A preferred group of epoxy ethers with which the aforementioned phosphorous compounds react with particular advantage are those prepared by reacting a dihydric phenol with epichlorhydrin in alkaline solution. These products are of resinous character and when used in the compositions of the invention, enable valuable materials, resistant against solvents, to be obtained upon curing with the phosphorous compound. Any of the various dihydric phenols are used in preparing these glycidyl ethers including mononuclear phenols like resorcinol, catechol, hydroquinone, etc., or polynuclear phenols like bis-(4-hydroxyphenyl)-2,2-propane(bis-phenol), 4,4'-dihydroxy benzophenone, bis - (4 - hydroxyphenyl) - 1,1-ethane, bis -(4 - hydroxyphenyl)-1,1-isobutane, bis - (4 - hydroxyphenyl)-2,2-butane, bis-(4 - hydroxy-2-methylphenyl)-2,2-propane, bis(4 - hydroxy-2-tertiary butyl phenyl)-2,2-propane, bis-(2-dihydroxynaphthyl)-methane, 1,5-dihydroxy naphthalene, etc.

The glycidyl ethers of the dihydric phenols are made by heating at 50° C. to 150° C. the dihydric phenol with epichlorhydrin, using one to two or more moles of epichlorhydrin per mol of the dihydric phenol. Also present is a base such as sodium, potassium, calcium or barium hydroxide in amount of 10 to 30% stoichiometric excess of the epichlorhydrin—i. e., 1.1 to 1.3 equivalents of base per mole of epichlorhydrin. The heating is continued for several hours to convert the reactant to a taffy-like consistency whereupon the reaction product is washed with water until free of base. Although the product is a complex mixture of glycidyl ethers, the principal product may be represented by the formula

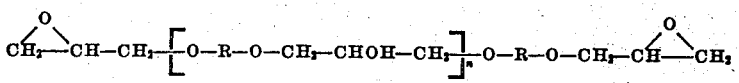

wherein R represents the divalent hydrocarbon radical of the dihydric phenol and $n$ is 0, 1, 2, 3, etc. The length of the chain can be made to vary by changing the molecular proportion of epichlorhydrin and dihydric phenol. Thus by decreasing the moles of epichlorhydrin per mole of dihydric alcohol from about two downwards toward one, the molecular weight and the softening point of the resinous glycidyl ether is increased. In general, these glycidyl ethers, having an epoxy equivalency between one and two, contain terminal 1,2-epoxy groups, and have alternate aliphatic and aromatic nuclei linked together by ethereal oxygen atoms.

The nature of the glycidyl ethers from dihydric phenols can be better understood by considering preparation of a particular product which I prefer to use in my invention. This product will hereinafter be designated by the term Resin A.

Resin A

In a reaction vessel fitted with a stirrer, 4 moles of bis-(4-hydroxyphenyl) - 2, 2, propane (bis-phenol) and 5 moles of epichlorhydrin are added to 6.43 moles of sodium hydroxide as a 10% aqueous solution. While being stirred, the reaction mixture is gradually heated to about 100° C. during 80 minutes' time and is maintained at 100-104° C. for an additional 60 minutes under reflux. The aqueous layer is decanted and the resin washed with boiling water until neutral to litmus whereupon the resin is drained and dehydrated by heating to about 150° C.

The resulting resinous glycidyl ether has a softening point of 100° C. (Durran's mercury method) and a molecular weight of 1133 measured by boiling point elevation of a dioxane solution. The epoxide value is 0.116 equivalent per 100 grams so the epoxide equivalency is 1.32 epoxide groups per molecule.

In like manner, other resinous glycidyl ethers of bis-phenol may be prepared which will have different molecular weights depending upon the molar ratio of epichlorhydrin to dihydric phenol used in preparation thereof. This fact is illustrated by the following table which shows the varition in properties with variation in the molar ratio.

| Mol Ratio Epichlorhydrin to bis-Phenol | Mol Ratio NaOH to Epichlorhydrin | Softening Point | Molecular Weight | Equiv. Epoxy per 100 gms. | Epoxy Groups per Mol |
|---|---|---|---|---|---|
|  |  | ° C. |  |  |  |
| 2.0 | 1.1 | 43 | 451 | 0.318 | 1.39 |
| 1.4 | 1.3 | 84 | 791 | 0.169 | 1.34 |
| 1.33 | 1.3 | 90 | 802 | 0.137 | 1.10 |
| [1] 1.25 | 1.3 | 100 | 1,133 | 0.116 | 1.32 |
| 1.2 | 1.3 | 112 | 1,420 | 0.085 | 1.21 |

[1] Resin A.

These glycidyl ethers from bis-phenol are a complex mixture of compounds believed to have as the principal component thereof a substance which may be represented by the formula

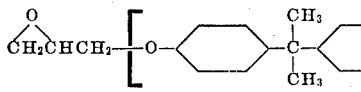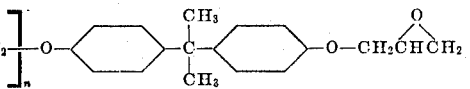

wherein $n$ is 0, 1, 2, 3, etc. It may be noted that the observed molecular weight and epoxy value are possibly low due to inherent inaccuracies of the methods of determining the values. The epoxy value appears to give only about 60% of the theoretical value, but in any event the epoxy equivalency is greater than one and the resinous glycidyl ethers cure to hard, tough, insoluble and infusible resins upon heating with the phosphorus-containing compound used in the invention.

The compositions of the invention comprise (1) the epoxy ether having a 1,2-epoxy equivalency greater than one, and (2) an orthophosphoric acid containing at least two acidic hydroxyl groups and not more than one alkyloxy group linked directly to the phosphorus atom, in which latter case the hydrogen atom of not more than one hydroxyl group of tribasic orthophosphoric acid is replaced with an alkyl group. The relative amounts of the two essential components of the compositions may be varied. Depending primarily upon the use to which the compositions are put, the compositions may contain such a proportion of the two components that there is present from approximately an equivalent amount to a molecular amount of the phosphorous compound per epoxy group of the ether. By an equivalent amount (which is the lower limit of the range of proportion), reference is made to having present one chemical equivalent of the phosphorous compound for each epoxy group of the ether. In this instance, the proportion of the two substances is dependent upon the fact that each acidic hydroxyl group of the orthophosphoric acid or mono-alkyl orthophosphate is chemically combinable on an equivalent basis with one epoxy group of the ether. By a molecular amount (the upper limit of the range) reference is made to using such a proportion of phosphorous compound in admixture with a given quantity of epoxy ether that there is present one molecule of orthophosphoric acid or mono-alkyl orthophosphate for each epoxy group supplied by the ether. When an equivalent amount is employed in the compositions, it is seen that the acidic hydroxyl groups of the phosphorous compound are exactly balanced with the epoxy groups from the ether, while when a molecular amount is utilized, there are present two extra acidic hydroxyls with orthophosphoric acid and one extra acidic hydroxyl with mono-alkyl orthophosphate.

When it is desired to subject the compositions to curing conditions whereby an insoluble and infusible product is obtained, there is used an approximately equivalent amount of orthophosphoric acid or mono-alkyl orthophosphate with the epoxy ether. For example, when diglycidyl ether is used with orthophosphoric acid, the ether has an epoxy value of about 1.54 equivalents of epoxy per 100 grams and the acid has a value of 3.06 equivalents of acidic hydroxyl per 100 grams so there is used about 50 parts by weight of the acid with each 100 parts by weight of the ether. If it were desired to employ monomethyl orthophosphate with the diglycidyl ether, about 86 parts of the former would be used with each 100 parts of the latter since the phosphate has an acidic hydroxyl equivalency of 1.79 per 100 grams. Likewise, when the glycidyl ether of bis-phenol is used such as Resin A which has an epoxy equivalency of about 0.116 equivalent of epoxy per 100 grams, there is used about 3.8 parts of orthophosphoric acid or 6.5 parts of monomethyl orthophosphate for each 100 parts of the glycidyl ether.

By having present an equivalent amount of the phosphorous compound with the epoxy ether, the composition can be cured to an insoluble and infusible resinous material. Moreover, the ability of the composition to cure is achieved with 50% to 150% of the equivalent amount of phosphorous compound present. Greater or lesser portions may be used in the compositions, if desired.

When the compositions are employed as a primer coating for rust-proofing ferruginous metals, it is desirable to use such a proportion that there is one molecular amount of the phosphorous compound for each epoxy group in the ether since extra acidic hydroxyl is needed for this purpose. The composition is treated to react the components thereof and the reaction product contains free acidic hydroxyl groups for reaction and bonderizing of the metal. But in this case, likewise, the proportions may be from 50% to 150% of the molecular amount of phosphorous compound. The compositions of the invention thus contemplate use of from 50% to 150% of the equivalent amount to the molecular amount of phosphorous compound per epoxy group of the ether therein. For example, the composition containing orthophosphoric acid with 100 parts by weight of Resin A having an epoxy equivalency of 0.116 equivalent of epoxy per 100 grams may contain orthophosphoric acid in amount of 1.9 parts (50% of the equivalent amount) to 17.7 parts (150% of the molecular amount).

In using the compositions, the temperatures employed can vary considerably and may range from room temperature (20° C.) to 250° C. Upon mixing the phosphorous compound with the glycidyl ether at room temperature, the product obtained is soluble in a variety of solvents as described below. A solution of this product is well suited when it is desired to use the composition as a protective coating for surface. After application to a surface, the coating is set up or cured by heating at 150° C. to 250° C. This procedure is suitable in applying the product as a rust-proofing primer to ferruginous metals. If desired, pigments or dyes may also be present in the metal primer.

Upon mixing the phosphorous compound with a glycidyl ether so as to combine the orthophosphoric acid or ester with the epoxy compound, it is not necessary to immediately apply the composition for the purpose intended. When glycidyl ethers of polyhydric phenols are used, the composition is stable and does not gel at room temperature for several days' time. Upon application of heat to the composition, it is rapidly converted to the cured product which would otherwise require a more prolonged time at ordinary atmospheric temperature.

The compositions of the invention are particularly useful for protective coatings by dissolving in an organic solvent and applying the solution to a surface with subsequent curing of the film of resin-forming material. Various solvents are suitable for this purpose such as lower saturated ketones like acetone, methyl ethyl ketone, methyl isobutyl ketone, methyl hexyl ketone, cyclohexanone, methyl cyclohexanone, etc.; esters like ethyl acetate, isopropyl acetate, butyl acetate, isoamyl acetate, etc.; cyclic ethers such as dioxane; and monoalkyl ethers of ethylene glycol like methyl, ethyl or butyl ethers. Preferably such solvents have a boiling point below 175° C. If desired, other materials like lower aromatic hydrocarbons such as benzene, toluene and/or xylene may be used in combination with the oxygen-containing compounds for the purpose of cheapening the cost of the solvent.

The solutions of the compositions of the invention are applied for coating surfaces needed to be protected by brushing, spraying and the like. The amount of solvent contained in the solution may be varied to suit the particular need. Ordinarily, the solution will contain about 5% to 60% of the composition of the invention. The solution is applied to the surface to be coated, and either the solvent is first allowed to evaporate, after which heat is applied by circulating hot air or by use of infra-red lamps, or the heating is effected with simultaneous removal of solvent and curing.

For the purpose of illustrating the invention and results obtainable therefrom, there are collected in the table below test characteristics of cured films from a variety of compositions. The films were prepared by dissolving Resin A in a solvent mixture containing equal parts by weight of xylene and the butyl ether of ethylene glycol. The solutions contained 50% by weight of resin. To the solutions were added the curing agents noted in the table, the percentages being based upon the weight of resin only. The solutions containing the curing agents were spread on glass panels, allowed to dry an hour at room temperature, and then cured by baking at 150° C. for 30 minutes. In all cases, the resulting films were hard. To determine the toughness of the films, a knife-point was plowed into the film. When a continuous ribbon of material was obtained, it was noted that the film was tough, but when the plowing caused a shower of chips, then the film was deemed brittle. The extent of cure was determined by placing a drop of toluene on the treated film for 15 minutes and observing whether any softening or dissolving of the film occurred.

| Curing Agent (per cent on resin content) | Scratch Test | 15 Min. Toluene Spot Test |
|---|---|---|
| 3.9% Orthophosphoric acid | Tough | Unchanged. |
| 8.8% Monomethyl orthophosphate | do | Do. |
| 7.8% Monoethyl orthophosphate | do | Do. |
| 10% Mono n-butyl orthophosphate | do | Do. |
| 12% Monoamyl orthophosphate | do | Do. |
| 10% Mixture of mono and dilauryl orthophosphate | do | Softened. |
| 10% Octadecyl diacid orthophosphate | Brittle | Dissolved. |

In the above table, it will be noted that with the lauryl and the octadecyl phosphates the toluene softened or dissolved the films indicating that the cure was incomplete. The use of somewhat longer baking times and/or higher baking temperatures are needed with these higher alkyl phosphates.

The cured films are very resistant to attack by various chemical agents. Furthermore, they are flexible as well as being hard and tough. For example, a solution containing 50% by weight of Resin A in equal parts of xylene and the monomethyl ether of ethylene glycol monoacetate was prepared and 8.5% of monobutyl orthophosphate based upon the weight of resin was added thereto. Films were prepared on glass and tinned steel panels allowing about one hour's drying time, followed by baking for 30 minutes at 150° C. The immersed part of the film on the metal panels was unchanged after immersing the coated panels half-way for comparsion in water for 18 hours at 20° C. and in SAE 20 lubricating oil for one-half hour at 100° C. The cured films were also unchanged when subjected to spot tests with toluene for 15 minutes, with 2% acetic acid for 30 minutes and with 2% aqueous sodium hydroxide for 30 minutes. The film showed no cracking or severence upon a coated metal panel being bent 180° over a ⅛ inch mandrel. The Sward hardness of the film was 42 and the Taber abrasion was 3.3 mg. per 100 cycles.

A cured film prepared in like manner except that 3.9% orthophosphoric acid based on the weight of Resin A was used in place of the butyl phosphate had a Sward hardness of 44 and a Taber abrasion of 4.3 mg. per 100 cycles.

When used as film-forming agents, the compositions may have various other materials besides solvents incorporated therewith such as acid resistant pigments and other resins. Thus pigments like titanium oxide, iron oxides, carbon black, and the like, may be used. Best results in preparing the enamels are obtained by grinding the pigment with a portion of the solvent and epoxy ether, and then adding the remainder of the solvent and epoxy ether after the grinding operation. The enamel is ready for application upon addition of the curing agent, the phosphorous compound.

Varnishes and enamels containing the compositions of the invention possess an advantageous property in that the cured films are not subject to appreciable yellowing or discoloration upon prolonged baking. This property is in marked contrast to epoxy ether compositions which employ polyfunctional amines which may also be used as curing agents. The resistance against discoloration upon prolonged baking is important in commercial use of coating compositions. A composition may be of such nature that only by exactly following particular time and temperature will a cured material free of discoloration be obtained, and if the time or temperature limitations are accidently exceeded, as may happen in commercial practice, serious discoloration occurs. The compositions of the present invention, on the contrary, are not subject to appreciable discoloration caused by overbaking.

This fact is evident from the results given in the table below wherein orthophosphoric acid was compared with diethylene triamine as a curing agent. Two groups of enamels were prepared using different solvents in each group. In each case, the enamel base was prepared from the ingredients noted below by dissolving the resin in the solvent, adding the pigment and grinding in a ball mill for 28-30 hours. Base I contained one-third part by weight each of Resin A, titanium dioxide pigment, and methyl isobutyl ketone. Base II contained 30.8% by weight of Resin A, 30.8% of titanium dioxide pigment, and 38.4% of monomethyl ether of ethylene glycol. Portions of each base were weighed and the curing agent noted in the table below was added, the percentage thereof being based on the amount of Resin A contained therein. The enamels were coated on clean steel panels which were allowed to dry an hour and the films cured by baking at 150° C. for 30 minutes. The color of the cured enamel films were then noted. The films were next subjected to an additional 24 hours of baking at 150° C. and the color was again observed. In the table, the color scale is such that the numeral 0 indicates a pure white color for the film and the numeral 5 indicates a light ivory color, while intermediate numerals have reference to uniform graded variations therebetween.

| Base | Curing Agent | Color after Curing | Color after Baking 24 hours |
|---|---|---|---|
| I | 4% Orthophosphoric acid | 0 | 1 |
| I | 4% Diethylene triamine | 2 | 5 |
| II | 4% Orthophosphoric acid | 0 | 1 |
| II | 4% Diethylene triamine | 0 | 5 |

With either varnishes or enamels containing the compositions of the invention, thick layers of the film-forming material may be applied to a surface. Curing completely therethrough is attained because the conversion to an insoluble film is not dependent upon contact with air. This fact also makes the compositions valuable in manufacture of laminates wherein the laminae are cloth, paper, glass-cloth and the like. Such laminae are impregnated with the compositions which are ordinarily dissolved in a volatile solvent like acetone. After drying, and, if desired, partial curing, the impregnated sheets are stacked and the cure completed in a press using sufficient pressure to form a homogeneous and coherent mass for the resin-forming material such as 200 to 1000 or more pounds per square inch.

The new compositions possess a peculiar and unexpected property making them particularly suitable for molding operations. Most resin-forming materials contract in volume during curing thereof. In contrast, the compositions of the invention tend to expand during curing. Consequently, upon manufacturing molded articles from the compositions by introducing the compositions into a mold with application of the curing heat and pressure, the resin-forming material flows and fills the mold sharply so that excellent molded articles are obtained. Various fillers, dyes and pigments may be incorporated with the compositions used for molding such as wood flour, talc, alpha-cellulose, asbestos, silica, carbon black, etc.

As explained hereinbefore, the compositions are particularly useful for coating ferruginous metals since the phosphorous compound rustproofs the metal as well as forming an integral part of the resinous material. The metal, after application of the rust-proofing primer, may be coated with conventional paints or other surface coating materials. The rust-proofing qualities will be evident from the following description.

A resinous glycidyl ether of bis-phenol was prepared in like manner to that previously described for preparation of Resin A except that the reactants were used in a ratio of 2 moles of epichlorhydrin for each mole of bis-phenol. The product had an epoxy value of 0.287 equivalent of epoxy per 100 grams. The product was mixed and reacted with orthophosphoric acid in such an amount that there was one mole of acid used for each epoxy group. Twenty-eight grams of orthophosphoric acid was dissolved in dioxane and the mixture was heated to 100° C. A solution of 100 grams of the glycidyl ether in 100 grams of dioxane was run in and the mixture was refluxed for 20 hours. The reaction mixture was then evaporated to dryness under vacuum. The product was a brittle solid soluble in dioxane, acetone or isopropyl alcohol and insoluble in benzene or n-butyl acetate. The acidity, titrating in isopropyl alcohol using phenolphthalein, was 0.43 equivalent per 100 grams. The per cent phosphorus was 7.0.

A 25% solution of the product in dioxane was applied to a clean steel panel, and after evaporation of the solvent, the panel was baked at 150° C. for 30 minutes. The resulting film was hard and clear. The coated panel was then placed in a cabinet maintained at 100° F. and 100% humidity. After 3 weeks' time, the film was still clear with no rust having developed thereunder.

While it is preferred to employ a mixture containing one mole of the phosphorus compound for each epoxy group when the composition is used for rust-proofing, this is not necessary as is evident from the results given in the following table on cured films. Solutions were prepared containing 50% by weight of Resin A in a mixture of equal parts by weight of xylene and the methyl ether of ethylene glycol acetate. The noted curing agents were added and the solutions applied to clean steel panels. After drying at room temperature, the panels were baked at 200° C. for 15 minutes. A scratch was put across the film cutting through to the metal. The panels were then placed in the humidity cabinet for observation.

| Curing Agent | Thickness, Mils | Exposure for 40 days at 100% humidity at 100° F. |
|---|---|---|
| None | 0.8-1.0 | Rusted badly. |
| 3.9% Orthophosphoric Acid | 0.7-1.0 | No rusting. Corrosion at scratch not spreading. |
| 8.4% Monobuty orthophosphate | 0.7-1.1 | Do. |

Another composition very suitable for rust-proofing contains the phosphorus compound and the glycidyl ethers of dihydric phenols made by reacting epichlorhydrin with the phenol and base, followed by introducing drying oil fatty acid radicals into the resulting ether in such a manner that after the esterification, the ether still contains epoxy groups. This phosphorus-containing composition sets up and cures by mere air drying without baking. The epoxy compound in the composition is prepared by reacting the glycidyl ether with the methyl ester of the drying oil fatty acid in the presence of sodium methylate as catalyst. For example, the methyl ester of linseed oil fatty acids and Resin A in equivalent quantities based on the hydroxyl content of the ether were heated at 150° C. in the presence of 1% sodium methylate. The methyl alcohol formed by the reaction was permitted to distill off. After 3½ hours, the heating was discontinued and the catalyst removed by washing with hot water. The cooled product was a thick sticky fluid which upon analysis showed an epoxy value of 0.047 equivalent per 100 grams, and an ester value of 0.192 equivalent per 100 grams. A 50% solution of this ester is slowly added to a solution of equal volume containing 4.6% of orthophosphoric acid held at a temperature of 100° C., the solvent being dioxane. The mixture is heated for several hours under reflux and is then ready for application. The phosphorus-containing resinous component will air dry to a hard film in 4 to 6 hours when mixed with drier such as 0.02% cobalt as cobalt naphthenate. In place of the linseed oil fatty acid ester, there may be used methyl esters of other drying oil acids such as the fatty acids from soya bean oil, dehydrated castor oil, tung oil and the like.

The cured compositions of the invention have the properties of adhering very tenaciously to surfaces as well as having high mechanical strength. Consequently, the compositions are very useful as adhesives.

The adhesive qualities of the compositions may be illustrated by considering some tests with a glycidyl ether made like Resin A except that 2.04 moles of epichlorhydrin per mole of bis-phenol were employed in preparing it. This glycidyl ether had an epoxy value of 0.326 equivalent of epoxy per 100 grams. The curing agent used in the composition was monobutyl orthophosphate. A number of compositions were prepared containing different amounts of the butyl phosphate. In order to have a fluid composition which could easily be applied as an adhesive or glue, about 25% by weight of tricresyl phosphate was added to the glycidyl ether while it was hot. After cooling, the desired amount of curing agent was added.

The adhesive was tested with oak blocks. The composition was spread on a one inch square surface of each of two oak blocks with the aid of a doctor blade having a clearance of 0.005 inch. The adhesive coated surfaces of the blocks were then united and the blocks were placed in a constant temperature room set at 77° F. A number of blocks were so prepared using adhesive compositions containing the different amounts of the butyl phosphate indicated in the table below. Glued blocks were removed from the constant temperature room at the indicated times and subjected to the block shear test of the Army-Navy-Civil Committee on Aircraft Design Criteria: "Wood Aircraft Inspection and Fabrication," ANC-19 (Dec. 20, 1943) discussed in an article by R. C. Rinker and G. M. Kline, Modern Plastics, vol. 23, p. 164, 1945. The values given in the table are the shear strength in pounds per square inch for the adhesive compositions containing the indicated percentages of monobutyl orthophosphate (based upon the weight of the glycidyl ether) and the indicated cure times.

| Per Cent Butyl Orthophosphate | Cure Time | | | | |
|---|---|---|---|---|---|
| | 18 hrs. | 45 hrs. | 144 hrs. | 312 hrs. | 1 mo. |
| 5 | Did not set | | | | |
| 10 | 1,180 | 1,575 | 1,790 | 2,130 | 2,050 |
| 15 | 1,310 | 1,795 | 2,100 | 1,930 | 1,660 |
| 20 | 1,120 | 1,000 | 1,260 | 670 | 780 |
| 25 | Did not set | | | | |

In like manner, the composition containing 15% monobutyl orthophosphate was tested as adhesive for other materials. The shear strength of these, after curing for 6 days, is given in the following table.

| Material Glued | Shear Strength, p. s. i. |
|---|---|
| Phenolic paper laminate | 2,250 |
| Copper | 3,250 |
| Brass | 2,800 |
| Stainless steel | 2,500 |

I claim as my invention:

1. A composition of matter consisting essentially of a glycidyl ether, having a 1,2-epoxy equivalency greater than one and being free from other elements than carbon, hydrogen, and oxygen, and also being free from other functional groups than epoxy, alcoholic hydroxyl, and acyloxy groups, in admixture with such a proportion of an orthophosphoric acid that there is present from 50% to 150% of the equivalent amount to the molecular amount of the orthophosphoric acid per epoxy group of said ether, said orthophosphoric acid containing at least two acidic hydroxyl groups and containing an alkyloxy group linked directly to the phosphorous atom when only two hydroxyl groups are present.

2. A composition of matter consisting essentially of a glycidyl ether, having a 1,2-epoxy equivalent greater than one and being free from other elements than carbon, hydrogen, and oxygen, and also being free from other functional groups than epoxy, alcoholic hydroxyl, and acyloxy groups in admixture with such a proportion of orthophosphoric acid, $H_3PO_4$, that there is present from 50% to 150% of the equivalent amount of said acid per epoxy group of said ether.

3. A composition of matter consisting essentially of a glycidyl ether, having a 1,2-epoxy equivalency greater than one and being free from other elements than carbon, hydrogen, and oxygen, and also being free from other functional groups than epoxy, alcoholic hydroxyl, and acyloxy groups, in admixture with such a proportion of monobutyl orthophosphate that there is present from 50% to 150% of the molecular amount of said orthophosphate per epoxy group of said ether.

4. A heat-curable composition of matter consisting essentially of a glycidyl ether of bis-(4-hydroxyphenyl)-2,2-propane, having a 1,2-epoxy equivalency greater than one, in admixture with such a proportion of orthophosphoric acid, $H_3PO_4$, that there is present from 50% to 150% of the equivalent amount of said acid per epoxy group of said ether.

5. A composition of matter consisting essentially of a glycidyl ether of bis-(4-hydrophenyl)-2,2-propane, having a 1,2-epoxy equivalency greater than one, in admixture with such a proportion of monobutyl orthophosphate that there is present from 50% to 150% of the equivalent amount of said orthophosphate per epoxy group of said ether.

6. A process which comprises bringing together and reacting at 20° C. to 250° C. a glycidyl ether, having a 1,2-epoxy equivalency greater than one and being free from other elements than carbon, hydrogen, and oxygen, and also being free from other functional groups than epoxy, alcoholic hydroxyl, and acyloxy groups, with such a proportion of an orthophosphoric acid that there is employed from 50% to 150% of the equivalent amount to the molecular amount of said acid per epoxy group of said ether, said acid containing at least two acidic hydroxyl groups and containing an alkyloxy group linked directly to the phosphorous atom when only two hydroxyl groups are present.

7. The reaction product obtained by the process defined in claim 6.

8. A process which comprises bringing together and reacting at 50° C. to 200° C. a glycidyl ether of bis-(4-hydroxyphenyl)-2,2-propane, having a 1,2-epoxy equivalency greater than one, with such a proportion of a mono-alkyl orthophosphate that there is employed 50% to 150% of the molecular amount of said orthophosphate per epoxy group of the ether.

9. The reaction product obtained by the process defined in claim 8.

10. A process which comprises heating and reacting at 50° C. to 200° C. a glycidyl ether of bis-(4-hydroxyphenyl)-2,2-propane, having a 1,2-epoxy equivalency greater than one, with such a proportion of mono n-butyl orthophosphate that there is employed 50% to 150% of the molecular amount of said orthophosphate per epoxy group of the ether.

11. The reaction product obtained by the process defined in claim 10.

12. A process for rust-proofing ferruginous metal which comprises mixing a glycidyl ether of bis-(4-hydroxyphenyl)-2,2-propane, having a 1,2-epoxy equivalency greater than one, with such a proportion of an orthophosphoric acid that there is employed 50% to 150% of the molecular amount of said orthophosphoric acid per epoxy group of the ether, which orthophosphoric acid contains at least two acidic hydroxyl groups and contains an alkyloxy group linked directly to the phosphorus atom when only two hydroxyl groups are present, applying the resulting product as a coating to the surface of the ferruginous metal, and baking the applied coating at 150° C. to 250° C.

13. A rust-proofing material comprising the reaction product of about a molecular amount of orthophosphoric acid, $H_3PO_4$, with respect to the epoxy equivalency of the hereinafter defined ether, and a glycidyl ether, having a 1,2-epoxy equivalency greater than one, obtained by reacting between one and two molecular amounts of epichlorhydrin with a molecular amount of bis-(4-hydroxyphenyl)-2,2-propane and 10% to 30% of the stoichiometric excess of sodium hydroxide followed by esterifying this reaction product by heating with the methyl ester of drying oil fatty acid in the presence of 0.1% to 5% of sodium alcoholate.

THEODORE F. BRADLEY.

REFERENCES CITED

The following references are of record in the file of this patent:

UNITED STATES PATENTS

| Number | Name | Date |
|---|---|---|
| 1,895,320 | Gravell | Jan. 24, 1933 |
| 1,977,251 | Stallman | Oct. 16, 1934 |
| 2,191,587 | Rothrock | Feb. 27, 1940 |
| 2,337,424 | Stoner, Jr., et al. | Dec. 21, 1943 |
| 2,411,590 | Powell, 3rd | Nov. 26, 1946 |

OTHER REFERENCES

Fairbourne et al.: Journal Chemical Society (London), (1932), pages 1965 to 1972.

Certificate of Correction

Patent No. 2,541,027 February 13, 1951

THEODORE F. BRADLEY

It is hereby certified that error appears in the printed specification of the above numbered patent requiring correction as follows:

Column 2, line 33, for "(bis-(4-hydrophenyl)" read *bis-(4-hydroxyphenyl)*; lines 46 and 47, for "methylglicidyl" read *methylglycidyl*; column 4, line 64, for "2,2, propane" read *2,2-propane*; column 6, line 47, for the word "portions" read *proportions*; line 71, for "17.7 parts" read *17.1 parts*; column 7, line 6, for "surface" read *surfaces*; column 10, line 70, in the table, first column thereof, for "Monobuty" read *Monobutyl*; column 12, line 46, for "phosphorous" read *phosphorus*; line 50, for "equivalent" read *equivalency*; column 13, line 4, for "hydrophenyl" read *hydroxyphenyl*; line 24, for "phosphorous" read *phosphorus*;

and that the said Letters Patent should be read as corrected above, so that the same may conform to the record of the case in the Patent Office.

Signed and sealed this 26th day of June, A. D. 1951.

[SEAL].

THOMAS F. MURPHY,
*Assistant Commissioner of Patents.*